3,436,393
4′-METHOXY-2,2,4-TRIALKYL-Δ³-ISOFLAVAN COMPOUNDS

Horace Albert De Wald, Ann Arbor, Mich., assignor to Parke, Davis & Company, Detroit, Mich., a corporation of Michigan
No Drawing. Filed Dec. 27, 1965, Ser. No. 516,684
Int. Cl. C07d 99/04, 7/20; A61k 27/00
U.S. Cl. 260—247.7                    6 Claims

ABSTRACT OF THE DISCLOSURE

Novel 4′-methoxy-2,2,4 - trialkyl-Δ³ - isoflavan compounds of formula

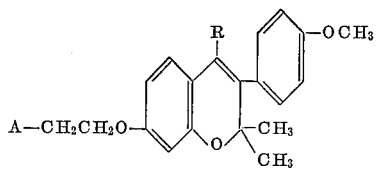

are provided by condensing a corresponding 7-hydroxy Δ³-isoflavan compound with a β-aminoethyl halide of formula, Hal—$CH_2CH_2A$; where A is dialkylamino, pyrrolidino, etc., and R is alkyl, cyclopropyl, $CF_3$ or $C_2F_5$. The products have pharmacological properties and are useful as antibacterial agents and as oral agents in the treatment of hypercholesteremia.

SUMMARY AND DETAILED DESCRIPTION

This invention relates to novel heterocyclic chemical compounds and to means for producing the same. More particularly, the invention relates to novel 4′-methoxy-2,2, 4-trialkyl-Δ³-isoflavan compounds and acid addition salts thereof which in free base form have the formula:

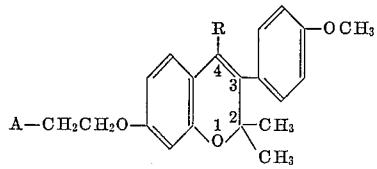

where R is a lower alkyl group (i.e., an alkyl group containing 1 to 4 carbon atoms) or a cyclopropyl, trifluoromethyl or pentafluoroethyl group, and A is a lower dialkylamino, morpholino, pyrrolidino or piperidino group or a methyl substituted pyrrolidino or piperidino group.

In accordance with the invention, the specified isoflavan compounds are produced by condensing a 7-hydroxy-4′-methoxy-2,2,4-trialkyl-Δ³-isoflavan compound of formula:

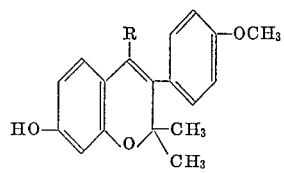

in the presence of a base with a β-aminoethyl halide compound Hal—$CH_2CH_2A$; where A and R have the abovementioned significance and Hal is a chlorine, bromine or iodine atom. In carrying out the condensation, it is ordinarily satisfactory to employ equimolar quantities of the reactants and the base. It is preferred, however, to employ a slight excess of the base and a moderate to large excess of the β-aminoethyl halide reactant. A solvent is ordinarily employed for the reaction. Any of various solvents can be used such as water; lower alkanols; ethers, such as diethyl ether, dioxane, tetrahydrofuran and diethylene glycol dimethyl ether; hydrocarbons such as benzene and toluene; tertiary amides such as N-methyl-2-pyrrolidone and dimethylformamide; as well as miscible mixtures of such solvents. A preferred solvent is dimethylformamide. As a base for the condensation, alkali metal hydroxides, alkoxides and hydrides may be used. When using dimethylformamide as a solvent, sodium hydride is a preferred base. In general, hydrides are preferred for use with nonhydroxylic solvents.

The reaction temperature and reaction time are not critical and may be varied widely. For example, with sodium hydride and dimethylformamide the reaction is complete in periods ranging from 1 to 24 hours at reaction temperatures ranging from about 20–125° C. Preferred conditions using sodium hydride and dimethylformamide are temperatures in the range from about 80–120° C. for 2 to 4 hours.

The products of the invention have useful pharamacological properties. In particular, when used in standard tests in rats they are active by the oral route in lowering the blood cholesterol level at well tolerated doses, e.g., at 25 mg./kg. once daily for seven days. Thus, the products have application as oral agents in the treatment of hypercholesteremia. The products further possess antibacterial properties in vitro and therefore are useful as antibacterial agents. The products are also useful as intermediates for the production of other chemical products.

The free base products of the invention form acid addition salts by reaction with organic and inorganic acids. Some examples of acid addition salts of the invention are inorganic acid salts such as the hydrochloride, hydrobromide, hydroiodide, sulfate and phosphate, and organic acid salts such as the carbonate, succinate, benzoate, acetate, citrate, malate, maleate, p-toluenesulfonate, benzenesulfonate and sulfamate. The acid addition salts are conveniently formed by mixing the free base with at least an equivalent amount of the acid in a solvent in which the salt is insoluble, particularly after chilling, thereby permitting recovery of the desired salt as a solid phase. Whereas both the free base and salt forms of the product are useful for the purposes of the invention, the salts are generally preferred in those cases where solid and essentially neutral product forms, as well as increased water solubility, are desired. The invention contemplates the acid salts broadly. Those salts which are unsuited to particular uses, as for example uses where toxicity is a problem, are nevertheless useful as intermediates, being readily convertible to nontoxic acid salts by means which per se are known to those in the art.

The invention is illustrated by the following examples:

EXAMPLE 1

(a) To a solution of 9.0 g. of 7-hydroxy-4′-methoxy-2,2,4-trimethyl-Δ³-isoflavan in 100 ml. of dimethylformamide is added portionwise with stirring 1.75 g. of a 50% sodium hydride dispersion in mineral oil. A solution of 1-(β-chloroethyl)pyrrolidine (prepared by basifying a solution of 17 g. of the hydrochloride salt and extracting the liberated base) in 250 ml. of ether is added and the temperature is raised to 90° C. by distillation of solvent. The mixture is stirred at 90° C. for 3 hours, cooled and diluted with 250 ml. of benzene. The mixture is washed with water, then with saturated aqueous sodium chloride, dried and evaporated at reduced pressure to give as the product 4′-methoxy-2,2,4-trimethyl - 7 - (β - pyrrolidinoethoxy)-Δ³-isoflavan; M.P. 94–97° C. after recrystallization from methanol. The hydrobromide salt is obtained by treating an ethereal solution of the free base with one equivalent of hydrogen bromide in isopropyl alcohol. The sulfuric acid salt is obtained by dissolving the free base in ethanol containing an equimolar quantity of sulfuric acid and recovering the precipitate by filtration and recrystallization from isopropanol.

(b) The 7-hydroxy-Δ³-isoflavan starting material for the condensation process of paragraph (a) can be prepared in several steps from known materials, as follows: a mixture of 15 g. of 2,4-dihydroxyacetophenone, 16.6 g. of p-methoxyphenylacetic acid, 14 ml. of triethylamine and 50 ml. of acetic anhydride is stirred and heated at reflux for 48 hours. The mixture is cooled and the solid product, 7 - acetoxy-3-(p - methoxyphenyl)-4-methylcoumarin, removed by filtration; M.P. 205–207° C. after recrystallization from glacial acetic acid. A solution of 6.4 g. of this product in 150 ml. of benzene is added rapidly dropwise to an ethereal solution of methyl magnesium iodide, prepared from 4.8 g. of magnesium turnings and 12.5 ml. of methyl iodide in 100 ml. of ether. The mixture is stirred and heated at reflux 16 hours and then decomposed by the addition of 100 ml. of saturated aqueous ammonium chloride. The organic layer is separated, washed with saturated aqueous sodium chloride, dried and evaporated. The residual product, 4-(2,4-dihydroxyphenyl)-3-(p-methoxyphenyl)-2-methyl-3-penten-2-ol, is crystallized from methanol; M.P. 171–173° C. To a solution of 7.0 g. of the latter product in 250 ml. of boiling benzene is added 7 drops of 48% hydrobromic acid. The solution is heated at boiling for 20 minutes, cooled, dried and evaporated at reduced pressure to give the required isoflavan starting material, 7 - hydroxy - 4' - methoxy-2,2,4-trimethyl-Δ³-isoflavan; M.P. 142–144° C. after recrystallization from benzene-petroleum ether.

4-ethyl-4'-methoxy - 2,2 - dimethyl - 7 - (β-pyrrolidinoethoxy)-Δ³-isoflavan (M.P. 78–79° C. after recrystallization from methanol), the 4-ethyl homolog of the product of Example 1(a), can be prepared by the procedure of Example 1(a) using sodium hydride (1.0 g.), 1-(β-chloroethyl)pyrrolidine hydrochloride (12 g.) and 4-ethyl-7-hydroxy-4'-methoxy-2,2-dimethyl-Δ³-isoflavan (5.7 g., M.P. 139–142° C. from benzene-petroleum ether). The latter can be prepared by the procedure of Example 1(b) starting with 2,4-dihydroxypropiophenone (16.6 g.), p-methoxy-phenylacetic acid, triethylamine and acetic anhydride, reacting the resulting 7-acetoxy - 4 - ethyl-3-(p-methoxyphenyl)coumarin (8.5 g., M.P. 216–219° C. from glacial acetic acid) in benzene with methyl magnesium iodide (2.0 M) in ether, and treating the 4-(2,4-dihydroxyphenyl)-3-p - methoxyphenyl)-2-methyl-3-hexen-2-ol (7.4 g., M.P. 136–138° C. from benzene-petroleum ether) with hydrobromic acid.

EXAMPLE 2

(a) Starting with 6.0 g. of 7-hydroxy-4'-methoxy-2,2-dimethyl-4-(trifluoromethyl)-Δ³-isoflavan in 90 ml. of dimethylformamide, the procedure of Example 1(a) is followed using 0.9 g. of 50% sodium hydride in mineral oil and 1-(β-chloroethyl)- pyrrolidine (from 10 g. of the hydrochloride) in 200 ml. of ether. The free base product obtained, after heating and workup as in Example 1(a), is 4'-methoxy-2,2-dimethyl-7-(β-pyrrolidinoethoxy)-4-(trifluoromethyl)-Δ³-isoflavan. The corresponding citrate salt is prepared by treating an acetone solution of the free base with an equivalent of citric acid and isolating the resulting crystalline product; M.P. 88–91° C.

(b) The 7-hydroxy-Δ³-isoflavan starting material can be prepared by the following step-wise procedure:

A mixture of 20.6 g. of α,α,α-trifluoro-2,4-dihydroxy-acetophenone, 16.6 g. of p-methoxyphenylacetic acid, 14 ml. of triethylamine and 50 ml. of acetic anhydride is stirred and heated for 48 hours. After cooling, the product is removed as a solid by filtration. The product is 7-acetoxy-3-(p-methoxyphenyl) - 4 - (trifluoromethyl)coumarin; M.P. 139–142° C. after recrystallization from glacial acetic acid. A solution of 8.5 g. of the product in 150 ml. of benzene is added dropwise to 100 ml. of 2.0 M methyl magnesium iodide in ether. The mixture is held at reflux for 16 hours and is then decomposed by addition of saturated aqueous ammonium chloride solution. The organic layer is removed, washed, and dried. The residual product after removal of the solvent is 4-(2,4-dihydroxyphenyl) - 5,5,5 - trifluoro-3-(p-methoxyphenyl)-2-methyl-3-penten-2-ol; M.P. 168–170° C. after recrystallization from benzene-petroleum ether. A mixture of 4.5 g. of the pentenol product and 1.5 g. of p-toluenesulfonic acid in 350 ml. of benzene is stirred and heated at reflux under a water separator for 1½ hours. The mixture is cooled, washed first with dilute aqueous sodium bicarbonate and then with saturated aqueous sodium chloride and finally is concentrated by removal of solvent at reduced pressure. The residual product is 7 - hydroxy - 4' - methoxy-2,2-dimethyl-4-trifluoromethyl-Δ³-isoflavan; M.P. 148–151° C. after adsorption and elution of a chloroform solution on an activated magnesium silicate column, followed by evaporation of the eluate and recrystallization of the residue from benzene-petroleum ether.

The foregoing methods of Examples 1(a) and 2(a) can be used for the production of related products of the invention, by substituting the appropriate isoflavan starting material which in turn can be prepared by the methods of Examples 1(b) and 2(b) from the corresponding 2,4-dihydroxyphenone. The following table summarizes the melting point characteristics for four such products, obtained in crystalline form by these methods, as well as the corresponding intermediates for their production.

REPRESENTATIVE 4-ALKYL SUBSTITUTED PRODUCTS AND INTERMEDIATES, M.P. CENTIGRADE (CRYSTALLIZATION SOLVENT)

| 4-alkyl-7-acetoxy-3-(p-methoxyphenyl)-coumarin | 4-(2,4-dihydroxyphenyl)-3-(p-methoxyphenyl)-2-methyl-3-alken-2-ol | 4-alkyl-7-hydroxy-4'-methoxy-2,2-dimethyl-Δ³-isoflavan | 4-alkyl-4'-methoxy-2,2-dimethyl-7-(β-pyrrolidinoethoxy)-Δ³-isoflavan citrate, monohydrate |
|---|---|---|---|
| 4-propyl, 172–175° (glacial acetic acid) | 3-hepten-2-ol, 152–154° (benzene-petroleum ether) | 4-propyl, 104–107° (benzene-petroleum ether) | 4-propyl, 117–120° (acetone) |
| 4-pentafluoroethyl,[1] 127–130° (95% ethanol) | 5,5,6,6,6-pentafluoro-3-hexen-2-ol, 178–180° (benzene) | 4-pentafluoroethyl, 140–142° (chloroform-petroleum ether) | 4-pentafluoroethyl, 95° (acetone) |
| 4-isopropyl, 213–215° (glacial acetic acid) | 5-methyl-3-hexen-2-ol, 149–150° (benzene-petroleum ether) | 4-isopropyl (oil) | 4-isopropyl, 75–78° (acetone) |
| 4-isobutyl, 149–151° (glacial acetic acid) | 6-methyl-3-hepten-2-ol, 148–150° (benzene-petroleum ether) | 4-isobutyl (oil) | 4-isobutyl, 114–115° (acetone) |

[1] Prepared from α,α,β,β,β-pentafluoro-2,4-dihydroxypropiophenone (M.P. 77–79° C. from chloroform) which in turn can be made by treating a mixture of resorcinol (22 g.) and pentafluoropropionic acid (33 g.) in tetrachloroethane (50 ml.) with gaseous boron trifluoride to obtain an 18-gram weight increase, heating at 75–85° C. for 2 hours, pouring into aqueous sodium acetate (60 g. in 400 ml.), extracting with chloroform, and isolating the product from the extract.

EXAMPLE 3

(a) Sodium hydride in mineral oil (50% dispersion, 1.1 g.) is added portionwise with stirring to a solution of 6.4 g. of 4-cyclopropyl-7-hydroxy-4'-methoxy-2,2-dimethyl-Δ³-isoflavan in 90 ml. of dimethylformamide. A solution of 1-(β-chloroethyl)piperidine (prepared by basifying a solution of 12.5 g. of the hydrochloride salt and extracting the liberated free base) in 250 ml. of ether is added, and the mixture is heated at 90° C. for 3 hours. The reaction mixture is then cooled and the product isolated as in Example 1(a). The product is 4-cyclopropyl-4'-methoxy - 2,2 - dimethyl-7-(β-piperidinoethoxy)-Δ³-isoflavan.

(b) Gaseous boron trifluoride is bubbled into a mixture of 22 g. of resorcinol and 18 g. of cyclopropanecarboxylic acid in 50 ml. of tetrachloroethane until the weight gain is approximately 18 g. The mixture is heated at 75–85° C. for 2 hours, then poured into a solution of 60 g. of sodium acetate in 400 ml. of water. About 100 ml. of chloroform is added. The organic layer is separated, washed with water, dried and evaporated to give cyclopropyl 2,4-dihydroxyphenyl ketone. After recrystallization from benzene, the product melts at 94–96° C. A mixture of 17.8 g. of this product, 16.6 g. of p-methoxyphenylacetic acid, 14 ml. of triethylamine and 50 ml. of acetic anhydride is stirred and heated at reflux for 2 days. The mixture is cooled and the product which separates is collected by filtration. The product is 7-acetoxy - 4 - cyclopropyl-3-(p-methoxyphenyl)coumarin; M.P. 158–160° C. after recrystallization from ethanol. A solution of 6.0 g. of the latter product is added dropwise to 100 ml. of 1.5 M methyl magnesium iodide in ether. The mixture is refluxed for 16 hours, then decomposed with aqueous ammonium chloride solution. The organic layer is separated, washed, dried and the solvent removed by evaporation. The residual product is 4-cyclopropyl - 4 - (2,4-dihydroxyphenyl)-3-(p-methoxyphenyl)-2-methyl-3-buten-2-ol; M.P. 168–170° C. after recrystallization from benzene-petroleum ether. A solution of 5.0 g. of this product in 50 ml. of acetic anhydride is heated at reflux for 1½ hours, then evaporated to dryness at reduced pressure to give 4-cyclopropyl-7-hydroxy-4′-methoxy-2,2-dimethyl-Δ³-isoflavan acetate ester; M.P. 119–121° C. after recrystallization from benzene-petroleum ether. The acetate ester product and 2.0 g. of sodium hydroxide are dissolved in 40 ml. of 90% ethanol and the solution is stirred at room temperature for 1 hour. The solution is diluted with water, acidified with acetic acid and extracted with ether. The ether extract is washed with aqueous sodium bicarbonate, then with water, dried and evaporated to give a residue of the isoflavan suitable for use in the procedure of paragraph (a) of this example wtihout further purification.

By the same procedure of paragraph (a), but substituting the following corresponding starting materials, the following products are obtained:

| 7-hydroxy-Δ³-isoflavan | β-Aminoethyl halide | Product |
| --- | --- | --- |
| 7-hydroxy-4′-methoxy-2,2-dimethyl-4-(trifluoromethyl)-Δ³-isoflavan (6.0 g.). | 1-(β-chloroethyl)-morpholine hydrochloride (10.0 g.). | 4′-methoxy-2,2-dimethyl-7-(β-morpholinoethoxy)-4-(trifluoromethyl)-Δ³-isoflavan. |
| 4-ethyl-7-hydroxy-4′-methoxy-2,2-dimethyl-Δ³-isoflavan (5.7 g.). | 1-(β-bromoethyl)-2,6-dimethyl-piperidine (12.5 g.). | 7-[β-(2,6-dimethylpiperidino)ethoxy]-4-ethyl-4′-methoxy-2,2-dimethyl-Δ³-isoflavan. |
| 7-hydroxy-4′-methoxy-2,2,4-trimethyl-Δ³-isoflavan (9.0 g.). | 1-(β-chloroethyl)-2-methylpyrrolidine hydrochloride (18.4 g.). | 7-[β-(2-methylpyrrolidino)ethoxy]-4′-methoxy-2,2,4-trimethyl-Δ³-isoflavan. |

EXAMPLE 4

Sodium hydride (50% dispersion in mineral oil, 0.8 g.) is added to a solution of 5.0 g. of 7-hydroxy-4-isobutyl-4′-methoxy-2,2-dimethyl-Δ³-isoflavan in 75 ml. of dimethylformamide. A solution of β-diethylaminoethyl chloride (obtained by basifying a solution of 9.0 g. of the hydrochloride salt and extracting with ether) is added and the mixture is heated at 90° C. for 3 hours. The reaction mixture is then cooled and the product isolated as in Example 2(a). The product is 7-(β-diethylaminoethoxy)-4-isobutyl - 4′ - methoxy - 2,2-dimethyl-Δ³-isoflavan citrate monohydrate; M.P. 128–130° C. The corresponding pamoate salt is obtained by mixing an aqueous solution of 2 equivalents of the citrate salt with one equivalent of disodium pamoate in water. The insoluble pamoate salt which separates is collected, washed and dried.

Following the same procedure but using 9.0 g. of 7-hydroxy-4′-methoxy-2,2,4-trimethyl-Δ³-isoflavan in 100 ml. of dimethylformamide, 1.75 g. of 50% sodium hydride in oil, and the free base from 10 g. of β-dimethylaminoethyl chloride hydrochloride in 200 ml. of ether, one obtains as the free base product: 4′-methoxy-2,2,4-trimethyl-7-(β-dimethylaminoethoxy)-Δ³-isoflavan. The salicylate salt is obtained by mixing acetone solutions of equivalent amounts of the free base and salicylic acid, concentrating if necessary to cause the salt to separate out, and collecting and drying the solid product.

I claim:
1. A member selected from the group consisting of a free base having the formula

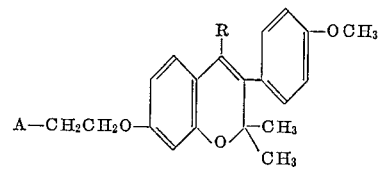

and its acid addition salts; where R is a member selected from the group consisting of alkyl of 1 to 4 carbon atoms, cyclopropyl, trifluoromethyl and pentafluoroethyl, and A is a member selected from the group consisting of dimethylamino, diethylamino, morpholino, pyrrolidino, piperidino, 2-methyl pyrrolidino and 2,6-dimethyl piperidino.

2. A compound according to claim 1 where R is trifluoromethyl and A is pyrrolidino.

3. A compound according to claim 1 where R is ethyl and A is pyrrolidino.

4. A compound according to claim 1 where R is isobutyl and A is pyrrolidino.

5. A compound according to claim 1 where R is isobutyl and A is diethylamino.

6. A compound according to claim 1 where R is trifluoromethyl and A is morpholino.

References Cited

Naoto Inoue: Chemical Abstracts, vol. 61, p. 5601 (1964).

ALEX MAZEL, *Primary Examiner.*

JOSE TOVAR, *Assistant Examiner.*

U.S. Cl. X.R.

167—65, 65.5; 260—294.7, 326.5, 345.2, 613